United States Patent
Schneider

(10) Patent No.: US 8,069,871 B2
(45) Date of Patent: Dec. 6, 2011

(54) VENTED PROTECTIVE CANOPY HOUSING FOR GRILL

(75) Inventor: Eric R. Schneider, Tampa, FL (US)

(73) Assignee: Grill House, Inc., Riverview, FL (US)

( * ) Notice: Subject to any disclaimer, the term of this patent is extended or adjusted under 35 U.S.C. 154(b) by 38 days.

(21) Appl. No.: 12/042,383

(22) Filed: Mar. 5, 2008

(65) Prior Publication Data
US 2009/0223547 A1    Sep. 10, 2009

(51) Int. Cl.
*E04H 15/02* (2006.01)
*A47J 37/00* (2006.01)

(52) U.S. Cl. ............ 135/96; 135/93; 135/117; 135/161; 126/29; 126/201

(58) Field of Classification Search .............. 135/90–91, 135/96, 98, 16, 33.7, 33.71, 117, 135, 161; 150/154, 165; 126/29–30, 25 R, 9 R, 276, 126/201; 442/136; 108/44, 50.12
See application file for complete search history.

(56) References Cited

U.S. PATENT DOCUMENTS

| | | | |
|---|---|---|---|
| 312,446 A | 2/1885 | Drake | |
| 3,233,618 A * | 2/1966 | Ferrier | 108/42 |
| 4,086,931 A * | 5/1978 | Hall | 135/98 |
| 4,285,354 A * | 8/1981 | Beavers | 135/135 |
| 4,449,542 A * | 5/1984 | McSwain et al. | 135/98 |
| 5,172,712 A | 12/1992 | Robinson | |
| 5,564,452 A | 10/1996 | Kitchen | |
| 5,950,617 A | 9/1999 | Lorenz | |
| 6,516,823 B1 * | 2/2003 | Glover et al. | 135/94 |
| 6,561,178 B1 | 5/2003 | Hayes | |
| 6,752,088 B2 * | 6/2004 | Poarch et al. | 108/44 |
| 6,881,506 B2 | 4/2005 | Anderson et al. | |
| 7,207,344 B2 * | 4/2007 | Wu | 135/158 |
| 2002/0179211 A1 * | 12/2002 | Neal et al. | 150/154 |
| 2003/0084895 A1 | 5/2003 | Hayes | |
| 2003/0196562 A1 * | 10/2003 | Trickett | 99/482 |
| 2004/0087232 A1 | 5/2004 | Anderson et al. | |
| 2005/0133076 A1 | 6/2005 | Zutich | |
| 2007/0006908 A1 | 1/2007 | Arlis | |
| 2007/0175504 A1 * | 8/2007 | Tseng | 135/98 |

* cited by examiner

*Primary Examiner* — Winnie Yip
(74) *Attorney, Agent, or Firm* — The Livingston Firm; Edward M. Livingston, Esq.; Bryan L. Loeffler, Esq.

(57) ABSTRACT

A protective canopy housing (1) for a barbeque grill (2) having a canopy (6) with a vent opening on a top (22) with an elevated vent cover (8). The canopy is supported by supports (5*a*, *b* and *c*) attached to a grill by C-clamps (4*a*,*b*). The canopy housing can include side curtains (10*a*, *b*) which may be rolled up and secured along the sides of the canopy. The side curtains may include mesh and can be maintained in a down position during use to protect the users from insects. The curtains can be removably detachable. The canopy would preferably be made of heat-resistant material.

23 Claims, 3 Drawing Sheets

VENTED PROTECTIVE CANOPY HOUSING FOR GRILL

BACKGROUND OF THE INVENTION

This invention relates to protective housings and more particularly to a vented canopy housing for a grill that protects the user from weather and other elements during use and the grill itself when not in use.

Currently, grills, also known as barbeques, are used outdoors to cook meats, vegetables and other foodstuffs thereon. During inclement weather, particularly when it is raining, individuals are generally disinclined to use the grill as the user of the grill may become wet when grilling and the food may become ruined when the grill is opened while checking the food. Moreover, individuals are also less inclined to use a grill when there are numerous insects about, such as mosquitoes or flies.

Thus, there is a need for a protective housing for a grill that can provide shelter for a user during use and can remain on the grill to protect the grill itself when not in use.

The relevant prior art includes the following documents:

| Patent No. (U.S. unless stated otherwise) | Inventor | Issue/Publication Date |
| --- | --- | --- |
| 5,564,452 | Kitchen | Oct. 15, 1996 |
| 2004/0087232 A1 | Anderson et al. | May 06, 2004 |
| 6,881,506 B2 | Anderson et al. | Apr. 19, 2005 |
| 312,446 | Drake | Feb. 17, 1885 |
| 2007/0006908 A1 | Arlis | Jan. 11, 2007 |
| 5,172,712 | Robinson | Dec. 22, 1992 |
| 5,950,617 | Lorenz | Sep. 14, 1999 |
| 2005/0133076 A1 | Zutich | Jun. 23, 2005 |
| 2003/0084895 A1 | Hayes | May 08, 2003 |
| 6,561,178 B1 | Hayes | May 13, 2003 |

None of the above prior art features a vented protective canopy housing for a grill as is provided by the present invention.

SUMMARY OF THE INVENTION

The primary object of the present invention is to provide a grill cover to protect the user of a grill from rain and other inclement weather.

Another object of the present invention is to provide such a covering that can remain on a grill during and after use.

Another object of the present invention is to provide such a protective covering that protects the user from biting insects and other bugs during use.

A further object of the present invention is to provide such a protective covering with a vent so it can remain on a grill during use and expel smoke from within.

The present invention fulfills the above and other objects by providing a canopy housing for an outdoor barbeque grill having an umbrella-like canopy of sufficient size and shape to accommodate the grill and user, the canopy having a top and lower sides. The canopy housing has a vent opening on the top for allowing smoke to exhaust from the canopy when the grill is in use. The vent opening has an elevated cover to protect rain from coming in through the vent. The canopy is supported above the grill by a frame which has attachment means, such as C-clamps, for securing the canopy to the grill. The canopy housing may have at least one curtain attached to its lower sides extending to the ground. At least one of the curtains may be detachable and/or can be rolled up and secured by straps with fasteners for fastening to the lower sides of the canopy as desired. At least one curtain may consist of a solid material which will protect the grill when it is rolled down and/or may include a mesh curtain that can remain down to protect the user from insects while using the grill.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
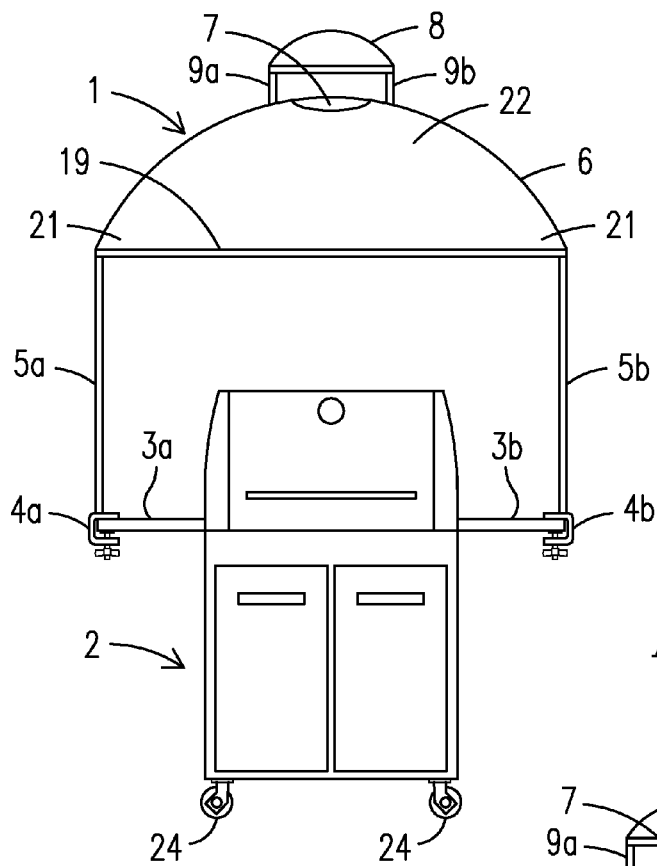
FIG. 1 is a front view of the grill canopy housing of the present invention without curtains.

For purposes of describing the preferred embodiment, the terminology used in reference to the numbered components in the drawings is as follows:

| | |
| --- | --- |
| 1. | grill canopy housing, generally |
| 2. | grill |
| 3.a, b | grill side shelves |
| 4.a, b, c | C-clamps |
| 5.a, b, c | canopy supports |
| 6. | canopy |
| 7. | vent |
| 8. | vent cover |
| 9.a, b, c | vent cover supports |
| 10.a, b | side curtains |
| 11. | front curtain |
| 12. | curtain straps |
| 13.a, b | rolled up side curtains |
| 14. | mesh curtains |
| 15. | rolled up mesh curtains |
| 16. | mesh curtain straps |
| 17. | rolled up solid curtains |
| 18. | solid curtain straps |
| 19. | canopy support frame |
| 20. | vent mesh |
| 21. | lower sides of canopy |
| 22. | top of canopy |
| 23. | fasteners (zippers, hook and loop) |
| 24. | Grill wheels |

In the following detailed description, reference will be made to the attached drawings in which:

FIG. 1 illustrates the basic embodiment of the grill canopy housing of the present invention without any side curtains. The canopy housing 1 has a canopy top 6 with lower sides 21 and a top 22, similar to the shape of an umbrella. The canopy housing has a vent 7 on the top 22 to allow smoke to exit the canopy housing when the grill 2 is in use. The vent 7 is in turn covered by a vent cover 8 with a smaller canopy 8 supported on the top 22 by supports 9a and 9b. The grill canopy housing 1 is supported above the grill 2 by at least two canopy supports 5a and b, which may comprise metal rods fastened to the grill 2 by C-clamps 4a and 4b attached to the side shelves 3a and 3b of the grill 2. Although the drawing Figures show the canopy attachment means secured to the side shelves 3a and 3b of the grill 2, the attachment position can be elsewhere, such as the legs of the grill, even to the wheels 24.

Figure 2:
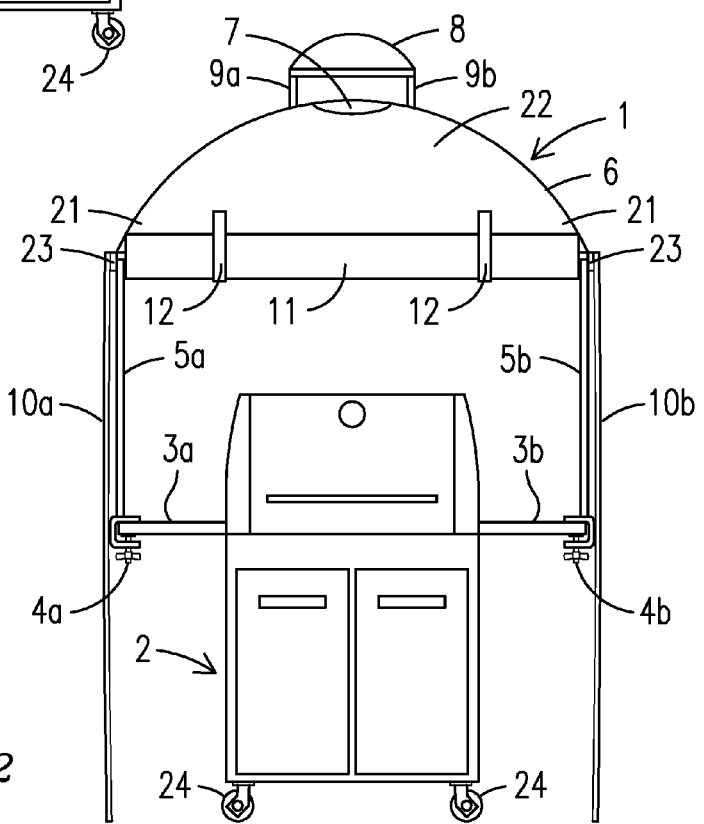
FIG. 2 is a front view of the grill canopy housing of the present invention with one side curtain in extended position.

FIG. 2 illustrates the grill canopy housing of the present invention with side curtains 10a and 10b on each side and in an extended position from the lower sides of the canopy 21 to a ground surface. Also illustrated in FIG. 2 is a rolled-up front curtain 11 secured in a rolled-up position by straps 12 which are attached to an inner lower side of the canopy 6, then around curtain 11 to the canopy 6 by the various fastening means, which may include snaps, hook and loop fastening material and other fasteners. The side curtains 10a, 10b, front curtain 11 and back curtain (not shown) may be made removably attachable to the canopy by zippers or hook and loop fastening material 23 or permanently attachable and rolled up as needed.

Figure 3:
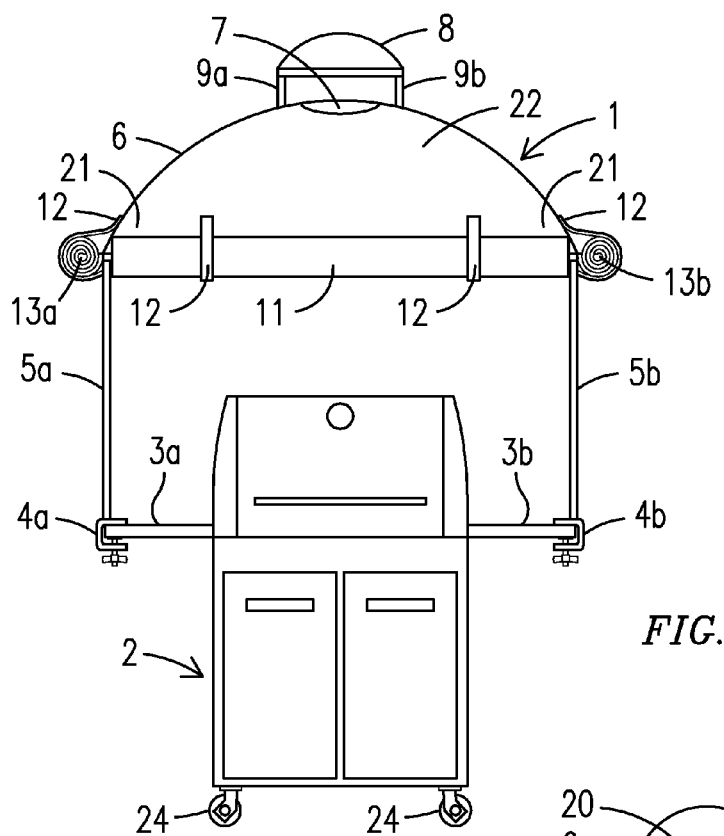
FIG. 3 is a front view of the grill canopy housing of FIG. 2 with the one side curtain in a rolled-up position.

FIG. 3 shows the grill canopy housing of the present invention with the side curtains 13a and 13b in a rolled-up position along the lower sides 21 of the canopy 6. The rolled up side curtains 13a and 13b may be maintained in the rolled up position by straps 12 secured to the canopy by various fastening means. The canopy 6 as well as the vent cover canopy 8 could be made of almost any material, but preferably one that is heat resistant due to the heat created by the grill during use. Such material may include layered cloth, such as that made under the trademark Sunbrella, which could be lined with a metallic-coated material on the inside.

Figure 4:
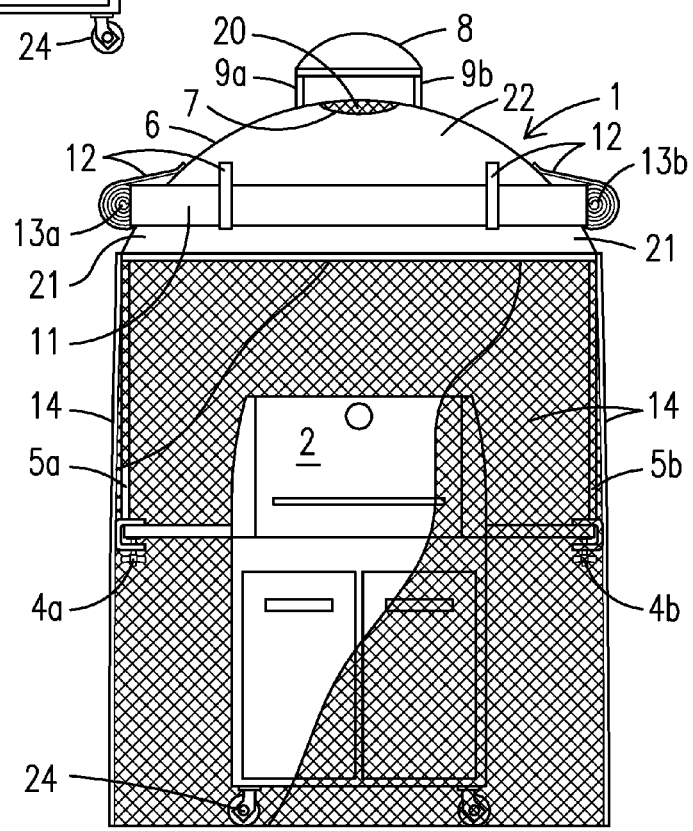
FIG. 4 is a front view of the grill canopy housing of the present invention having two side curtains, a solid curtain in a rolled-up position and a mesh curtain in a down position.

FIG. 4. depicts the grill canopy housing of the present invention a second set of curtains 14 made of mesh which could be kept in a extended position to protect a user from mosquitoes and other insects during use of the grill. In this embodiment the canopy vent 7 may also be covered by mesh as well to keep insects from infiltrating inside the canopy, although such would not be a major problem when the grill is in use due to smoke from the grill.

Figure 5:
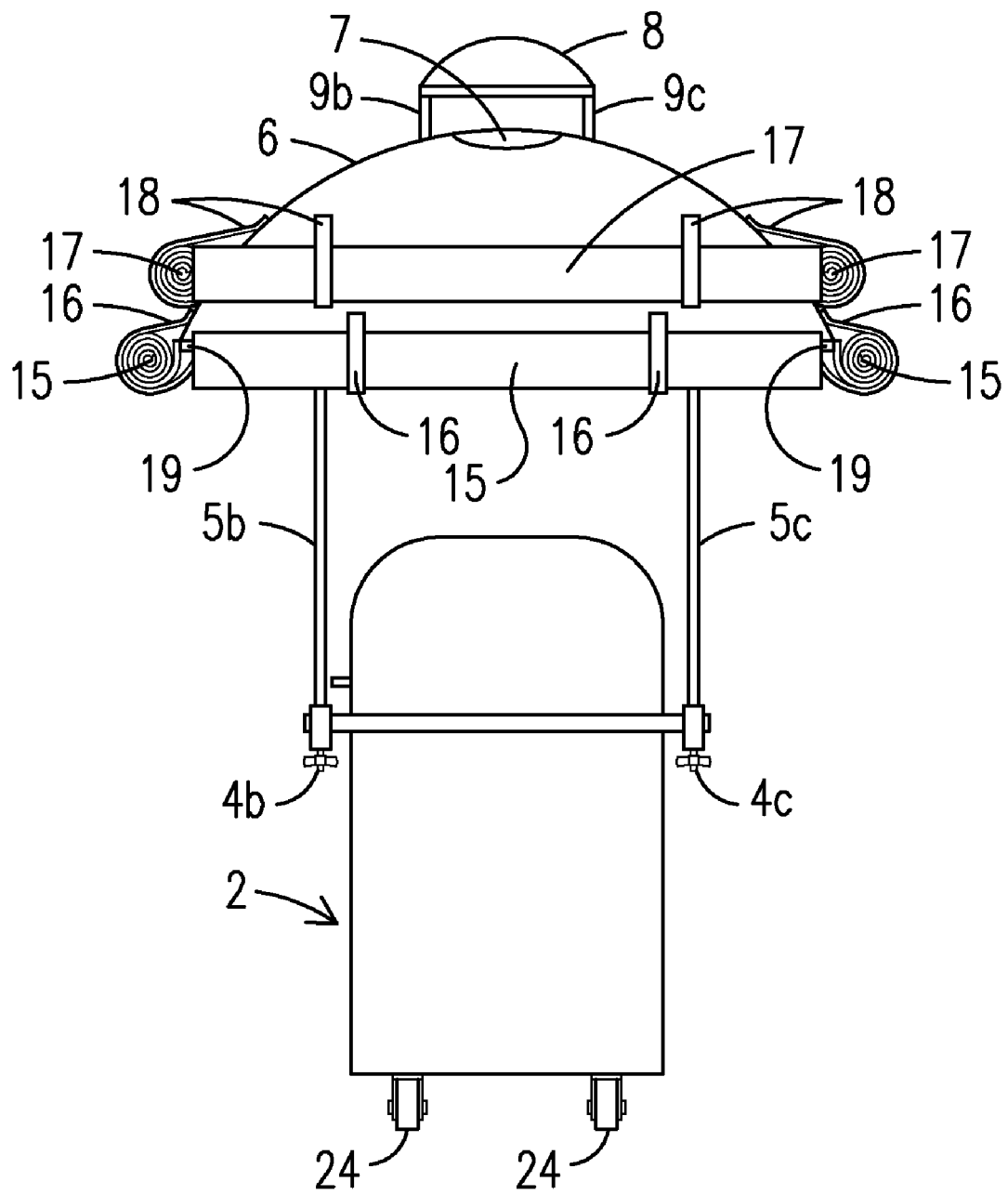
FIG. 5 is a side view of the grill canopy housing of FIG. 4 with the two side curtains in a rolled-up position.

Finally, FIG. 5 shows the grill canopy housing of the present invention from the side with all curtains in a rolled-up position. The lower mesh curtains 15 are secured in a rolled-up position by a strap 16 to the side of the canopy 6. The second solid material curtain 17 is also maintained in a roll-up position to the side of the canopy by straps 18. The canopy 6 again is supported by support rods 5b and c on each side, such as 5b and 5c, attached to the grill by C-clamps, 4a and 4c. The support rods 5b and 5c are attached to frame 19 which supports the canopy 6 above the grill. The canopy 6 itself may have a skeletal frame (not shown) to support it in an umbrella-like fashion over the grill.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A canopy housing for an outdoor barbeque grill, said canopy housing comprising:
a substantially rectangular-shaped canopy frame having a front, a rear, a right side, a left side and four corners;
a dome shaped canopy having lower sides being attached on the substantially rectangular-shaped canopy frame and a top of the canopy extending upward and being supported above the rectangular-shaped canopy frame;
said canopy frame and canopy being of sufficient size and shape to accommodate the outdoor barbecue grill and a user;
a vent on the top of the canopy for allowing smoke to exhaust from the canopy when the outdoor barbecue grill is in use;
a cover elevated above the vent;
at least two canopy supports extending downward from the canopy frame; and
a means for attaching a lower end of each of the at least two canopy supports to the outdoor barbecue grill.

2. The canopy housing of claim 1 wherein:
the means for attaching the lower end of each of the at least two canopy supports to the outdoor barbecue grill comprises at least one C-clamp.

3. The grill canopy housing of claim 1 further comprising:
a substantially rectangular-shaped front curtain extending downward from the front of the substantially rectangular-shaped canopy frame;
a substantially rectangular-shaped rear curtain extending downward from the rear of the substantially rectangular-shaped canopy frame;
a substantially rectangular-shaped right side curtain extending downward from the right side of the substantially rectangular-shaped canopy frame; and
a substantially rectangular-shaped left side curtain extending downward from the left side of the substantially rectangular-shaped canopy frame.

4. The grill canopy housing of claim 3 wherein:
the front curtain, the rear curtain, the right side curtain and the left side curtain are all removably attachable to the canopy via at least one fastener.

5. The grill canopy housing of claim 3 wherein:
the front curtain, the rear curtain, the right side curtain and the left side curtain may each be rolled up and secured in a rolled position along the lower sides of the canopy by a plurality of straps.

6. The grill canopy housing of claim 1 further comprising:
a substantially rectangular-shaped front mesh curtain extending downward from the front of the substantially rectangular-shaped canopy frame;
a substantially rectangular-shaped rear mesh curtain extending downward from the rear of the substantially rectangular-shaped canopy frame;
a substantially rectangular-shaped right side mesh curtain extending downward from the right side of the substantially rectangular-shaped canopy frame;
a substantially rectangular-shaped left side mesh curtain extending downward from the left side of the substantially rectangular-shaped canopy frame.

7. The grill canopy housing of claim 6 wherein:
the front mesh curtain, the rear mesh curtain, the right side mesh curtain and the left side mesh curtain are all removably attachable to the canopy via at least one fastener.

8. The grill canopy housing of claim 6 wherein:
the front mesh curtain, the rear mesh curtain, the right side mesh curtain and the left side mesh curtain may each be rolled up and secured in a rolled position along the lower sides of the canopy by a plurality of straps.

9. A canopy housing for an outdoor barbeque grill, said canopy housing comprising:
a substantially rectangular-shaped canopy frame having a front, a rear, a right side, a left side and four corners;

a dome shaped canopy having lower sides being attached on the substantially rectangular-shaped canopy frame and a top of the canopy extending upward and being supported above the rectangular-shaped canopy frame;

said canopy frame and canopy being of sufficient size and shape to accommodate the outdoor barbecue grill and a user a vent on the top of the canopy for allowing smoke to exhaust from the canopy when the outdoor barbecue grill is in use;

a cover elevated above the vent;

at least four canopy supports extending downward from the canopy frame; and a means for attaching a lower end of each of the at least four canopy supports to the outdoor barbecue grill.

10. The canopy housing of claim 9 wherein:
the means for attaching the lower end of each of the at least four canopy supports to the outdoor barbecue grill comprises at least one C-clamp.

11. The grill canopy housing of claim 9 further comprising:
a substantially rectangular-shaped front curtain extending downward from the front of the substantially rectangular-shaped canopy frame;
a substantially rectangular-shaped rear curtain extending downward from the rear of the substantially rectangular-shaped canopy frame;
a substantially rectangular-shaped right side curtain extending downward from the right side of the substantially rectangular-shaped canopy frame; and
a substantially rectangular-shaped left side curtain extending downward from the left side of the substantially rectangular-shaped canopy frame.

12. The grill canopy housing of claim 11 wherein:
the front curtain, the rear curtain, the right side curtain and the left side curtain are all removably attachable to the canopy via at least one fastener.

13. The grill canopy housing of claim 11 wherein:
the front curtain, the rear curtain, the right side curtain and the left side curtain may each be rolled up and secured in a rolled position along the lower sides of the canopy by a plurality of straps.

14. The grill canopy housing of claim 9 further comprising:
a substantially rectangular-shaped front mesh curtain extending downward from the front of the substantially rectangular-shaped canopy frame;
a substantially rectangular-shaped rear mesh curtain extending downward from the rear of the substantially rectangular-shaped canopy frame;
a substantially rectangular-shaped right side mesh curtain extending downward from the right side of the substantially rectangular-shaped canopy frame;
a substantially rectangular-shaped left side mesh curtain extending downward from the left side of the substantially rectangular-shaped canopy frame.

15. The grill canopy housing of claim 14 wherein:
the front mesh curtain, the rear mesh curtain, the right side mesh curtain and the left side mesh curtain are all removably attachable to the canopy via at least one fastener.

16. The grill canopy housing of claim 14 wherein:
the front mesh curtain, the rear mesh curtain, the right side mesh curtain and the left side mesh curtain may each be rolled up and secured in a rolled position along the lower sides of the canopy by a plurality of straps.

17. A canopy housing for an outdoor barbeque grill, said canopy housing comprising:
a substantially rectangular-shaped canopy frame having a front, a rear, a right side, a left side and four corners;
a substantially dome shaped canopy having lower sides being attached on the substantially rectangular-shaped canopy frame and a top of the canopy extending upward and being supported above the rectangular-shaped canopy frame;

said canopy frame and canopy being of sufficient size and shape to accommodate the outdoor barbecue grill and a user a vent on the top of the canopy for allowing smoke to exhaust from the canopy when the outdoor barbecue grill is in use;

a cover elevated above the vent;

at least four canopy supports extending downward from the canopy frame;

a means for attaching a lower end of each of the at least four canopy supports to the outdoor barbecue grill;

a substantially rectangular-shaped front curtain extending downward from the front of the substantially rectangular-shaped canopy frame;

a substantially rectangular-shaped rear curtain extending downward from the rear of the substantially rectangular-shaped canopy frame;

a substantially rectangular-shaped right side curtain extending downward from the right side of the substantially rectangular-shaped canopy frame; and a substantially rectangular-shaped left side curtain extending downward from the left side of the substantially rectangular-shaped canopy frame.

18. The canopy housing of claim 17 wherein:
the means for attaching the lower end of each of the at least four canopy supports to the outdoor barbecue grill comprises at least one C-clamp.

19. The grill canopy housing of claim 17 wherein:
the front curtain, the rear curtain, the right side curtain and the left side curtain are all removably attachable to the canopy via at least one fastener.

20. The grill canopy housing of claim 17 wherein:
the front curtain, the rear curtain, the right side curtain and the left side curtain may each be rolled up and secured in a rolled position along the lower sides of the canopy by a plurality of straps.

21. The grill canopy housing of claim 17 further comprising:
a substantially rectangular-shaped front mesh curtain extending downward from the front of the substantially rectangular-shaped canopy frame;
a substantially rectangular-shaped rear mesh curtain extending downward from the rear of the substantially rectangular-shaped canopy frame;
a substantially rectangular-shaped right side mesh curtain extending downward from the right side of the substantially rectangular-shaped canopy frame;
a substantially rectangular-shaped left side mesh curtain extending downward from the left side of the substantially rectangular-shaped canopy frame.

22. The grill canopy housing of claim 21 wherein:
the front mesh curtain, the rear mesh curtain, the right side mesh curtain and the left side mesh curtain are all removably attachable to the canopy via at least one fastener.

23. The grill canopy housing of claim 21 wherein:
the front mesh curtain, the rear mesh curtain, the right side mesh curtain and the left side mesh curtain may each be rolled up and secured in a rolled position along the lower sides of the canopy by a plurality of straps.

* * * * *